(12) United States Patent
Baur et al.

(10) Patent No.: US 11,615,120 B2
(45) Date of Patent: Mar. 28, 2023

(54) NUMERIC EMBEDDINGS FOR ENTITY-MATCHING

(71) Applicant: SAP SE, Walldorf (DE)

(72) Inventors: Stefan Klaus Baur, Heidelberg (DE); Matthias Frank, Heidelberg (DE); Hoang-Vu Nguyen, Leimen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/375,720

(22) Filed: Jul. 14, 2021

(65) Prior Publication Data

US 2022/0391414 A1    Dec. 8, 2022

Related U.S. Application Data

(60) Provisional application No. 63/196,473, filed on Jun. 3, 2021.

(51) Int. Cl.
| G06F 16/00 | (2019.01) |
| G06F 16/28 | (2019.01) |
| G06N 3/04 | (2023.01) |
| G06F 16/21 | (2019.01) |

(52) U.S. Cl.
CPC .......... *G06F 16/285* (2019.01); *G06F 16/211* (2019.01); *G06N 3/0445* (2013.01)

(58) Field of Classification Search
CPC .... G06F 16/285; G06F 16/211; G06N 3/0445
USPC ....................................................... 707/737
See application file for complete search history.

(56) References Cited

U.S. PATENT DOCUMENTS

2021/0397610 A1\* 12/2021 Singh ..................... G06N 7/005
                                                              707/707

\* cited by examiner

*Primary Examiner* — Alexandria Y Bromell
(74) *Attorney, Agent, or Firm* — Schwegman Lundberg & Woessner, P.A.

(57) ABSTRACT

Pairwise entity matching systems and methods are disclosed herein. A deep learning model may be used to match entities from separate data tables. Entities may be preprocessed to fuse textual and numeric data early in the neural network architecture. Numeric data may be represented as a vector of a geometrically progressing function. By fusing textual and numeric data, including dates, early in the neural network architecture the neural network may better learn the relationships between the numeric and textual data. Once preprocessed, the paired entities may be scored and matched using a neural network.

20 Claims, 5 Drawing Sheets

| | Bank Statement ID | Posting Date | Company Code | Amount | Currency | Business Partner Name | Note |
|---|---|---|---|---|---|---|---|
| 104a | 1000 | 5/20/2021 | CC1 | 9,999.05 | EUR | ABCD CORP | 1000789 |
| 104b | 2000 | 5/25/2021 | CC2 | 100 | US | EFG LTD | 90011878/879 |
| 104c | 3000 | 5/25/2021 | CC1 | 10,000 | EUR | ABCD CORP | 1000790 |

| | Document Number | Posting Date | Company Code | Amount | Currency | Organization |
|---|---|---|---|---|---|---|
| 108a | 1000789 | 5/20/2021 | CC1 | 9,999.05 | EUR | ABCD CORP |
| 108b | 90011878 | 5/25/2021 | CC2 | 25 | US | EFG LTD |
| 108c | 90011879 | 5/25/2021 | CC2 | 75 | US | EFG LTD |
| 108d | 1000790 | 5/25/2021 | CC1 | 10,000 | EUR | ABCD CORP |

| Bank Statement ID | Posting Date | Company Code | Amount | Currency | Business Partner Name | Note |
|---|---|---|---|---|---|---|
| 1000 | 5/20/2021 | CC1 | 9,999.05 | EUR | ABCD CORP | 1000789 |
| 2000 | 5/25/2021 | CC2 | 100 | US | EFG LTD | 90011878/879 |
| 3000 | 5/25/2021 | CC1 | 10,000 | EUR | ABCD CORP | 1000790 |

| Document Number | Posting Date | Company Code | Amount | Currency | Organization |
|---|---|---|---|---|---|
| 1000789 | 5/20/2021 | CC1 | 9,999.05 | EUR | ABCD CORP |
| 90011878 | 5/25/2021 | CC2 | 25 | US | EFG LTD |
| 90011879 | 5/25/2021 | CC2 | 75 | US | EFG LTD |
| 1000790 | 5/25/2021 | CC1 | 10,000 | EUR | ABCD CORP |

NUMERIC EMBEDDINGS FOR ENTITY-MATCHING

RELATED APPLICATIONS

This non-provisional patent application claims prior benefit, with regard to all common subject matter, of earlier-filed U.S. Provisional Patent Application No. 63/196,473, filed Jun. 3, 2021, and entitled "NUMERIC EMBEDDINGS FOR ENTITY-MATCHING." The identified '473 provisional patent application is hereby incorporated by reference in its entirety into the present application.

TECHNICAL FIELD

Embodiments generally relate to matching multi-modal entities from separate data tables. More specifically, embodiments relate to matching paired entities using a deep learning model that fuses textual and numeric data early in the neural network architecture to automate the matching process.

Typically, determining whether two entities (e.g., rows or columns in a data table) constitute a match requires a person to view and analyze the two entities to make the determination. Often, table data contains a mixture of structured and unstructured data. Structured data is data which has a clear type; for example, a Date field will often have structured data in the form of a date. Unstructured data is data which does not have a clear type or formatting convention. Different users or automated systems may input unstructured data in various formats. For example, a Reference Number field may not have a structured type, especially if the reference number contains leading zeroes. Some users who are entering in data may lead off the leading zeroes while other users may not. This variance in the structure of data may make it difficult for an automated processes to match entities. Consequently, two entities that constitute a match and contain differently formatted data or contain other inconsistencies may cause the entities to be incorrectly classified by typical machine learning algorithms, such as natural language processing models. Further, these models and other automated systems often fail to match numeric data consistently and properly and may make errors when comparing numbers that are textually similar but are orders of magnitude different. For example, a natural language processing model may make an incorrect determination that numbers that vary by orders of magnitude constitute a match due to their textual similarity based on a similar pattern of digits. Furthermore, these and other similar models may fail to correctly match dates that are represented by text. As such, matching paired entities is often done manually which is typically a labor-intensive and time-consuming endeavor.

Accordingly, a need exists for a machine learning method that can determine if paired entities are a match to automate the matching process. Additionally, the method should be able to handle various structured and unstructured data, including numeric and date data types.

SUMMARY

Disclosed embodiments address the above-mentioned problems by providing a method for preprocessing paired entities to fuse numeric and textual data types early in the neural network architecture. A first embodiment is directed to one or more non-transitory computer-readable media storing computer-executable instructions that, when executed by a processor, perform a method of matching data table entities, the method comprising ingesting a set of data comprising a plurality of entities, wherein each entity of the plurality of entities comprises textual data and numeric data, pairing entities from the plurality of entities to form an entity pair, for the textual data in each entity of the entity pair: tokenizing the textual data into a set of textual tokens, and contextualizing each textual token in the set of textual tokens by passing each textual token through at least one neural network, for the numeric data in each entity in the entity pair: converting each numeric value in the numeric data to an integer, and mapping each integer to a vector, concatenating the textual data with the numeric data to form a sequence for each entity in the entity pair, and analyzing the sequences using a deep learning model to classify the entity pair.

A second embodiment is directed to a method of matching data table entities, the method comprising ingesting a set of data comprising a plurality of entities, wherein each entity in the plurality of entities comprises textual data and numeric data, pairing entities form the set of data to form an entity pair, contextualizing, for each entity of the entity pair, the textual data using at least one neural network, mapping, for each entity in the entity pair, each numeric value of the numeric data to a vector, concatenating, for each entity of the entity pair, the textual data with the numeric data to form a sequence, and analyzing the sequences using a deep learning model to classify the entity pair.

A third embodiment is directed to a system for matching data table entities, the system comprising a data store storing a plurality of entities, and one or more non-transitory computer-readable media storing computer-executable instructions that, when executed by a processor, perform a method of matching data table entities, the method comprising pairing entities from the plurality of entities, wherein each entity comprises textual data and numeric data, for the textual data in each entity of the paired entities: tokenizing the textual data into a set of textual tokens, and contextualizing the textual data using at least one neural network, for the numeric data in each entity of the paired entities: converting each numeric value in the numeric data to an integer, and mapping each integer to a vector of a geometrically progressing frequency, concatenating the textual data with the numeric data to form a sequence for each entity of the paired entities, and analyzing the sequence using a deep learning model.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the disclosure.

DETAILED DESCRIPTION

In some embodiments, a machine learning method for determining if paired entities constitute a match by preprocessing entity data to fuse numeric and textual data early in a neural network architecture is provided. Paired entities are fed into a scoring function to determine whether the pair constitutes a match. The scoring function is determined and optimized via machine learning methods. A neural network may be trained on historical data to learn when entities from data tables match. In some embodiments, an entity comprises a row or a column in a data table. The preprocessed entity data may be sent to a decomposable attention model and thereafter fed into the scoring function to determine if the paired entities are a match. In some embodiments, the pairs may be categorized as Match, No Match, or Partial Match. Numeric inputs, including dates, may be mapped to integers and encoded as vectors of geometrically progressing frequencies during the preprocessing phase. Dates may be represented as a number of days since a reference day (e.g., Jan. 1, 2000). By fusing the numeric and textual information early in the neural network architecture, the neural network may learn better relationships from the various data modalities than by analyzing all data types as textual data. Further, improvements in the preprocessing state allows for the scoring function to be better trained to determine if the paired entities constitute a match.

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Figure 1:
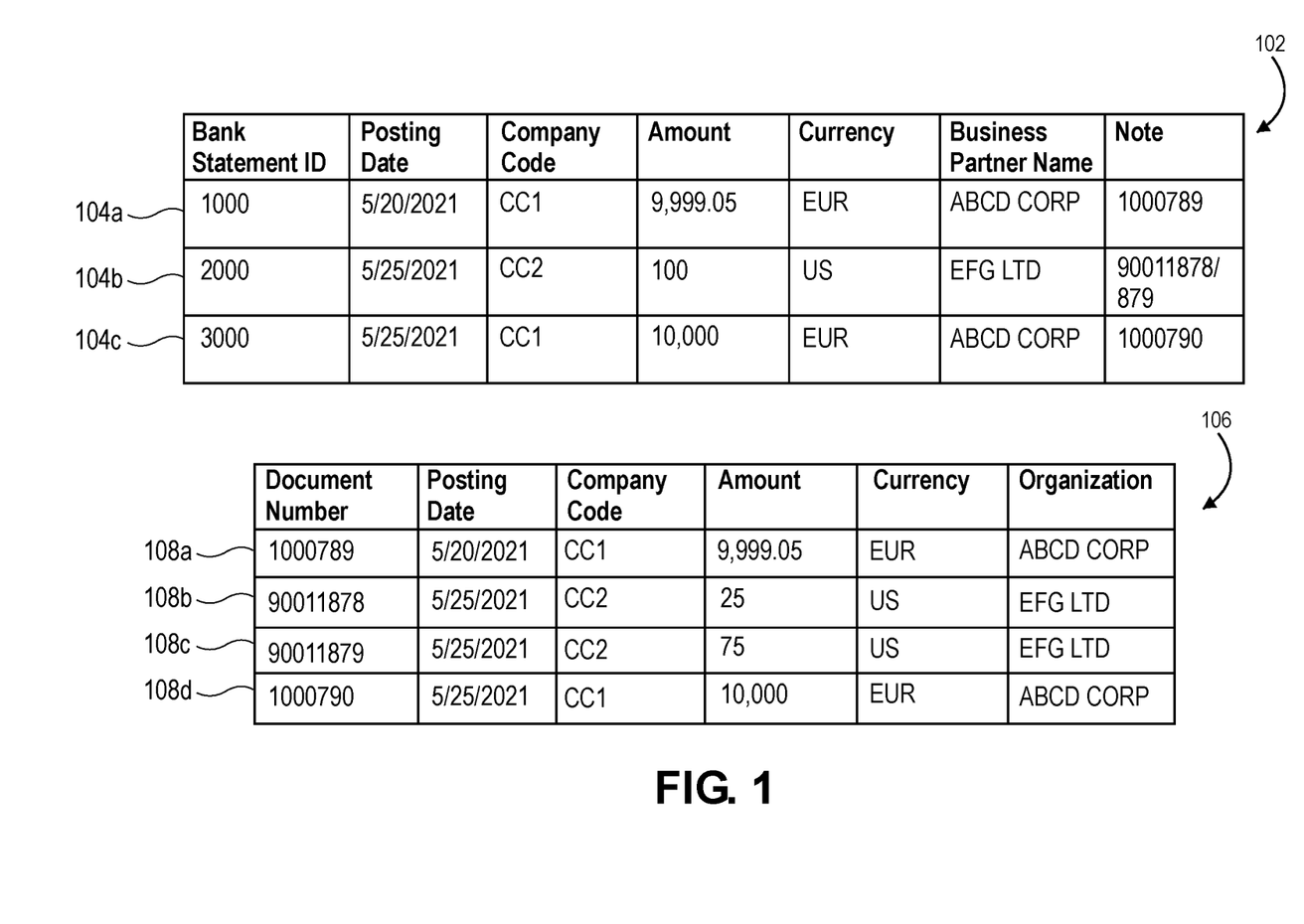
FIG. 1 depicts two data tables that may be entity-matched for certain embodiments.

FIG. 1 depicts two data tables from which entities may be paired. The data tables may represent financial information, such as incoming payments and outgoing invoices. Other use cases may include, but are not limited to, matching product catalogs, deduplicating a database, inter-company reconciliation, or returnable packaging management. Broadly, the matching of entities from any data table comprising multiple data types may be compared and matched using embodiments described herein. As illustrated, incoming payments table 102 comprises a plurality of incoming entities 104a, 104b, and 104c, where each incoming entity 104a-c is a row in incoming payments table 102. In some embodiments, the columns of the data tables may be the paired entities. Likewise, outgoing invoices table 106 comprises a plurality of outgoing entities 108a-d. As illustrated in FIG. 1, the size (i.e., the number of rows and columns) of incoming payments table 102 and outgoing invoices table 106 may vary. Incoming payments table 102 and outgoing invoices table 106 may have column and/or row headers denoting various categories or fields that each data value belongs to. In some embodiments, incoming payments table 102 and outgoing invoices table 106 are multimodal data tables comprising numeric, textual, date, and categorical data. For example, the 'Company Code' field represents categorical data which has a predetermined definition for the particular text string while the 'Amount' field represents a numerical data field.

Incoming payments table 102 and outgoing invoices table 106 illustrate various instances in which conventional automated entity matching models may fail to correctly match entities. For example, conventional methods may match 100 shown in the 'Amount' column of incoming entity 104b to 10,000 in the 'Amount' column of outgoing entity 108d despite the two values being orders of magnitude apart. However, because of the two numbers' textual similarity, conventional matching methods may assume the two numbers constitute a match or a near-match. Another potential issue is also illustrated in incoming entity 104b, where a single incoming payment is split into two entities (outgoing entities 108b and 108c) in outgoing invoices table 106. Small discrepancies between tables may also be accounted for using embodiments described herein. Such discrepancies may be due to exchange rates, for example. If discrepancies are present throughout a data set, the neural network may be trained to classify data that is within a certain error range as a match or a near-match to account for discrepancies. For example, the neural network may be trained to classifying dollar amounts that are within a 10-dollar difference as matches.

Incoming payments table 102 and outgoing invoices table 106 may comprise training data used to train the neural network to learn matches between entities. The neural network model may ingest a set of training data that comprises matching, non-matching, and/or partial-matching data. In some embodiments, when training the neural network, a set of ground truth data may be introduced. In some embodiments, the neural network is fed the correct outputs to help the neural network correctly and quickly adjust the weights. In some embodiments, the neural network is fed entities that do not match to learn patterns present in the non-matching data. In some embodiments, a trainable function may be constructed from the scoring data. The trainable function may be represented by a neural network which may be parameterized by a set of N floating point weights, where N represents the size of the neural network and the capacity of the neural network to learn matching patterns. Broadly, for training the neural network, a larger value for N is preferable; however, N may be limited by the amount of training data available. Once trained, the trainable function may be able to accurately determine whether two paired entities constitute a Match, No Match, or another classification, such as a Partial Match.

In deep learning models, the weights are used to determine the significance an input has on a predicted output. Smaller weights will have less impact on the predicted output of the neural network while larger weights will have a more significant impact on the predicted output. The training process involves feeding the deep learning model inputs and adjusting the weights based on the predicted output. Often, the actual output is supplied to the deep learning model to help in adjusting the weights to the final, optimal value.

During the training process, an optimization algorithm may be used to determine how the weights are used and to minimize the loss function. In some embodiments, gradient descent or stochastic gradient descent (SGD) may be used as the optimization algorithm. In some embodiments, extensions and variants of SGD may be used including, but not limited to, implicit updates SGD, the momentum method, averaging SGD, the adaptive gradient algorithm, Root Mean Square Propagation, Adaptive Moment Estimation (Adam), AMSGrad, backtracking line search, and the like.

To make the determination if the paired entities constitute a match or a no-match, a binary classification may be used. In some embodiments, the paired entities may be classified as a partial match. In some embodiments, cross-entropy loss (also referred to as log loss) may be used to make the binary classification or multi-class classification. In some embodiments, a generic neural network, such as a multilayer perceptron neural network, may be used to classify the paired entities into various categories.

Figure 2:
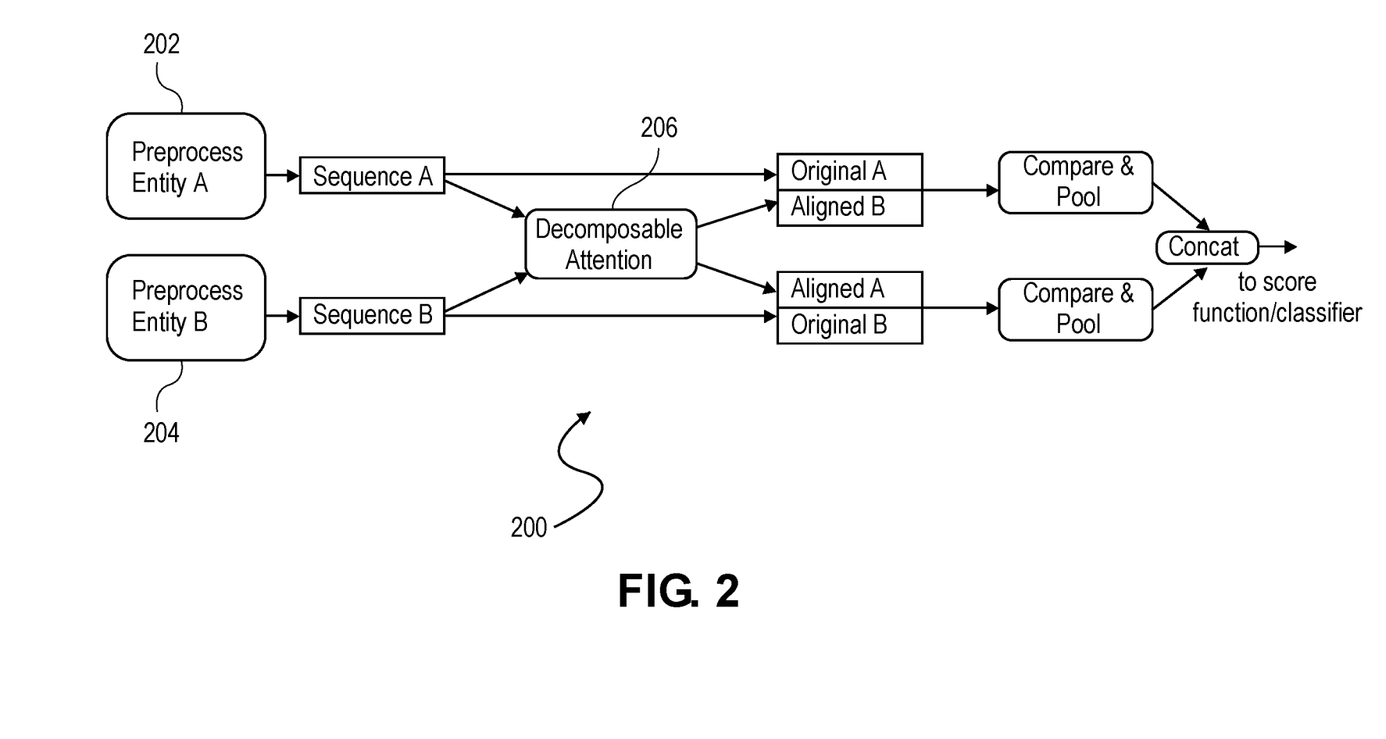
FIG. 2 depicts a decomposable attention neural network architecture for certain embodiments.

FIG. 2 illustrates a high-level schematic of decomposable attention neural network 200. As depicted, decomposable attention neural network 200 comprises two preprocessing steps, preprocessing entity A 202 and preprocessing entity B 204. Preprocessing entity A 202 and preprocessing entity B 204 may be done in parallel or subsequent to one another. The two preprocessing steps may be necessary to allow decomposable attention neural network 200 to accurately compare and match the paired entities. Both preprocessing entity A 202 and preprocessing entity B 204 may comprise substantially the same preprocessing steps before being fed into decomposable attention module 206. The preprocessing steps will be discussed in more detail below with respect to FIG. 3. As depicted, the output of preprocessing entity A 202 and preprocessing entity B 204 may be two distinct sequences, Sequence A and Sequence B, wherein each sequence has the same dimensions. In some embodiments, the sequences may have unequal dimensions. Subsequently, the two sequences are fed into decomposable attention module 206.

Decomposable attention module 206 analyzes one sequence (i.e., Sequence A), and for each token of the sequence, decomposable attention module 206 may determine a soft, weighted average of the tokens of the other sequence to create one token. This may be done using soft-alignment. In a soft-alignment attention neural network, a soft alignment is performed during the training process. The soft alignment may allow for the gradient of the cost function of the neural network to be backpropagated throughout the neural network architecture. This soft-alignment process is then repeated for the other sequence (i.e., Sequence B). Thereafter, decomposable attention module 206 outputs two separate sequences. One sequence comprising original tokens from Sequence A aligned with the matched tokens of Sequence B, and the second sequence comprises original tokens from Sequence B aligned with the matched tokens of Sequence A. Next, the two sequences are compared and optionally pooled to decrease the dimension of the model. The comparison may be performed by feeding the aligned sequences into a feed-forward network. In some embodiments the pooling comprises average pooling or maximum pooling. In some embodiments, the pooling sums up all of the compared tokens. Lastly, the two sequences are concatenated together and sent to a classifier to determine if the two sequences constitute a match. In some embodiments, the classifier is the trained scoring function described above. In some embodiments, the classifier is a multilayer perceptron neural network. Generally, any neural network classifier may be used to classify the paired entities after the preprocessing steps are complete and the resultant sequences have been passed through decomposable attention module 206.

When classifying entities in data tables, decomposable attention neural network 200 may pair each incoming entity 104a-c with each outgoing payment entity 108a-d and score each pairing. Once scored, the results may be aggregated, and the best matches or results of matches may be chosen and presented to a user. In some embodiments, a confidence score may also be presented that represents the confidence of the scoring made by decomposable attention neural network 200.

In some embodiments, various types of attention models may be used for pairwise matching. For example, a multi-head self-attention model or a scaled dot-product attention model may be used.

Figure 3:
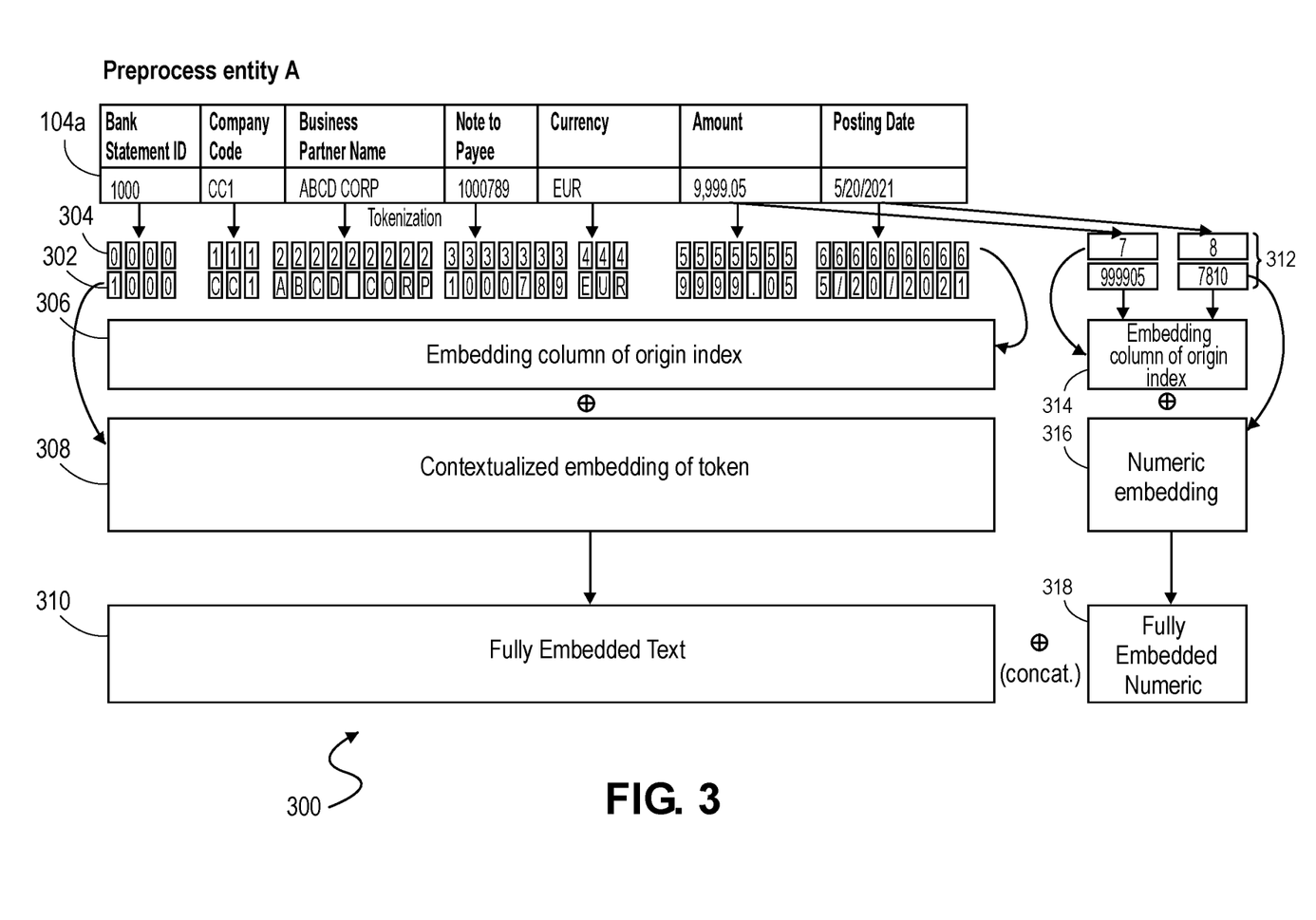
FIG. 3 depicts a neural network architecture for preprocessing entities for certain embodiments.

FIG. 3 illustrates a high-level neural network architecture for preprocessing an entity. Preprocessing architecture 300 may correspond to the preprocessing architecture used for preprocessing entity A 202 and preprocessing entity B 204 in decomposable attention neural network 200. Preprocessing architecture 300 may allow for fusing textual and numeric data early on in the architecture of decomposable attention neural network 200. As depicted, preprocessing architecture 300 receives an entity as an input, for example, incoming entity 104a from FIG. 1. Preprocessing for numerical and textual data may be split into two processes.

For textual data, the preprocessing may begin by tokenizing the text fields to create tokens 302 and then augmenting tokens 302 with an index 304. Index 304 may represent the field (i.e., the column) from which tokens 302 originated from. For example, 'Bank Statement ID' from incoming entity 104a is indexed with 0000 and each digit in the value 1000 is tokenized. As depicted, each token 302 may be associated with a single index 304. In some embodiments, and as depicted in FIG. 3, the tokenization occurs at a character level. In some embodiments, the tokenization occurs at a sub-word or whole word level. Numeric information, such as the monetary amount and the posting date, may also be tokenized and indexed as textual data as described above. In some embodiments, some or all of the numeric data in an entity may not be preprocessed as text. For example, preprocessing architecture 300 may be configured to preprocess the 'Bank Statement ID' field as text but may not preprocess the 'Amount' or 'Posting Date' fields as text.

Once the textual fields of incoming entity 104a have been tokenized and indexed, preprocessing architecture 300 moves to embedding block 306 where each index 304 may be embedded in the neural network architecture. The embeddings may allow for the model to learn relationships between fields in the table. The embeddings may be used to represent discrete variables as continuous vectors. By embedding the tokens, the overall dimensionality of decomposable attention neural network 200 may be reduced. In some embodiments, indexes 304 are embedded using a trainable embedding layer. Embedding may work to give meaning to the neural network for relationships between characters, words, sub-words, phrases, or the like. By using vectors, the distance between any two vectors may be calculated. In some embodiments, the distance is calculated using the scalar dot product. As such, the preprocessing architecture 300 may learn to associate two vectors that have a small distance between them in the vector space as potential matches while two vectors with a large distance between them are unlikely to be matches.

At contextualizing block 308, tokens 302 may be embedded using a trainable embedding layer. Tokens 302 may be passed through a plurality of 1-dimenisonal convolutional neural network layers to contextualize the tokens and form a contextualized sequence. As such, the decomposable attention neural network 200 may learn to recognize patterns within the text and to associate characters and/or strings of Sequence A's text with other similar characters and/or strings of Sequence B's text. The contextualized sequence may be a sequence of floating vectors. In some embodiments, tokens 302 may be contextualized using recurrent neural networks such as Long Short Term Memory networks, fully recurrent neural networks, recursive neural networks, or any other type of recurrent neural network.

At fully embedded text block 310, the outputs of contextualizing block 308 may be concatenated along the embedding dimension, thereby forming the contextualized sequence. Subsequently, the trainable embedding of the column of origin index from embedding block 306 may be attached to the contextualized sequence. In some embodiments the trainable embedding is attached by concatenation along the embedding dimension. In some embodiments, if the dimension of embedding block 306 matches the dimension of contextualizing block 308, the trainable embedding may be attached by addition.

Parallel or subsequent to the above-described contextualization steps, any numeric and/or date fields may undergo separate preprocessing steps. As shown, incoming entity 104a comprises numeric values in the 'Amount' field and a date value in the 'Posting Date' field. Each of these values may be indexed with a single value and mapped to a single integer as shown at numeric embedding block 312. It should be noted that the amount 9,999.05 has been converted from decimal form to an integer 999,905. Additionally, the date, May 20, 2021 has been converted to an integer 7810 which is the number of days since the reference date of Jan. 1, 2000.

Preprocessing may then move to numeric index embedding block 314 where the field of origin of each numeric value is embedded. Numeric index embedding block 314 may be substantially similar to embedding block 306 described above.

The numeric values may then be encoded at numeric embedding block 316. To represent the numeric values, the integers may be encoded as vectors of cosines and/or sines of geometrically progressing frequencies as shown in Equation 1.

$$x \to \begin{pmatrix} \cos(b^0 x) \\ \sin(b^0 x) \\ \cos(b^{-1} x) \\ \sin(b^{-1} x) \\ \cos(b^{1-d/2} x) \\ \sin(b^{1-d/2} x) \end{pmatrix} = \text{num\_embedding}(x) \quad \text{Eq. 1}$$

In Equation 1, x is the integer representing the numeric amount or date from the field. For example, in FIG. 3, x would be 999,905 when preprocessing the 'Amount; field and 7,810 when preprocessing the 'Posting Date' field. The integer may then be mapped to a d-dimensional numeric embedding by the function num_embedding(x). Amounts may be converted from a decimal amount to an integer by multiplying the amount by $10^e$, where e depends on the corresponding currency. For most currencies having monetary amounts with two decimal points, e is 2 to convert the decimal to an integer value.

Parameters b and d may vary depending on the data being processed by preprocessing architecture 300. In some embodiments, the parameter d represents the dimension of the vector. Broadly, b and d should be selected so that the expected range of values of x can be captured. In some embodiments, d may be set to a fixed amount, such as 32 or 64, and b may be selected by requiring $b^{1-d/2} x_{max=1}$, where $x_{max}$ is the maximum value of x expected to be encountered in the data set. In some embodiments, $x_{max}$ may be determined from domain knowledge or from the training data set used to train the neural network. Capturing the entire expected range of values for x may allow for variances in numbers having different orders of magnitude to be properly represented such that decomposable attention neural network 200 can properly learn relationships between the paired entities. For example, $x_{max}$ may be the largest value present in the training data set. As such, if incoming payments table 102 is being used to train decomposable attention neural network 200, the value '10,000' in incoming entity 104c would be set to be $x_{max}$. As another example, if it is known that incoming payments table 102 represents transactions having a maximum transaction limit of $50,000.00, $x_{max}$ may be set to 50,000 even if no transaction in incoming payments table 102 equals 50,000.

In some embodiments, numeric values may be encoded as vectors using various equations other than Equation 1. Broadly, the encoding equation should function such that a floating-point number can be expanded into a vector so that the elements of the vector are sensitive to contributions of integers on various orders of magnitude. For example, the encoding equation should be sensitive such that an input of 100 causes a different classification than an input of 10,000.

After the numeric data fields have been encoded, a projection may be applied to the embedded numeric value to match the dimension of the embedded numeric value to the dimension of the encoded text sequence formed at fully embedded text block 310. In some embodiments, the projection is a fully connected neural network layer that does not have an activation function. In some such embodiments, the projection comprises linear mapping. After applying the projection, another column of origin embedding may be added or concatenated to the embedded numeric value as described above. The resultant fully embedded numeric 318 values may then be attached to the fully embedded tokens, thus resulting in the final sequence having a dimension equal to the sum of the dimensions of the text fields and the numeric fields.

Figure 4:
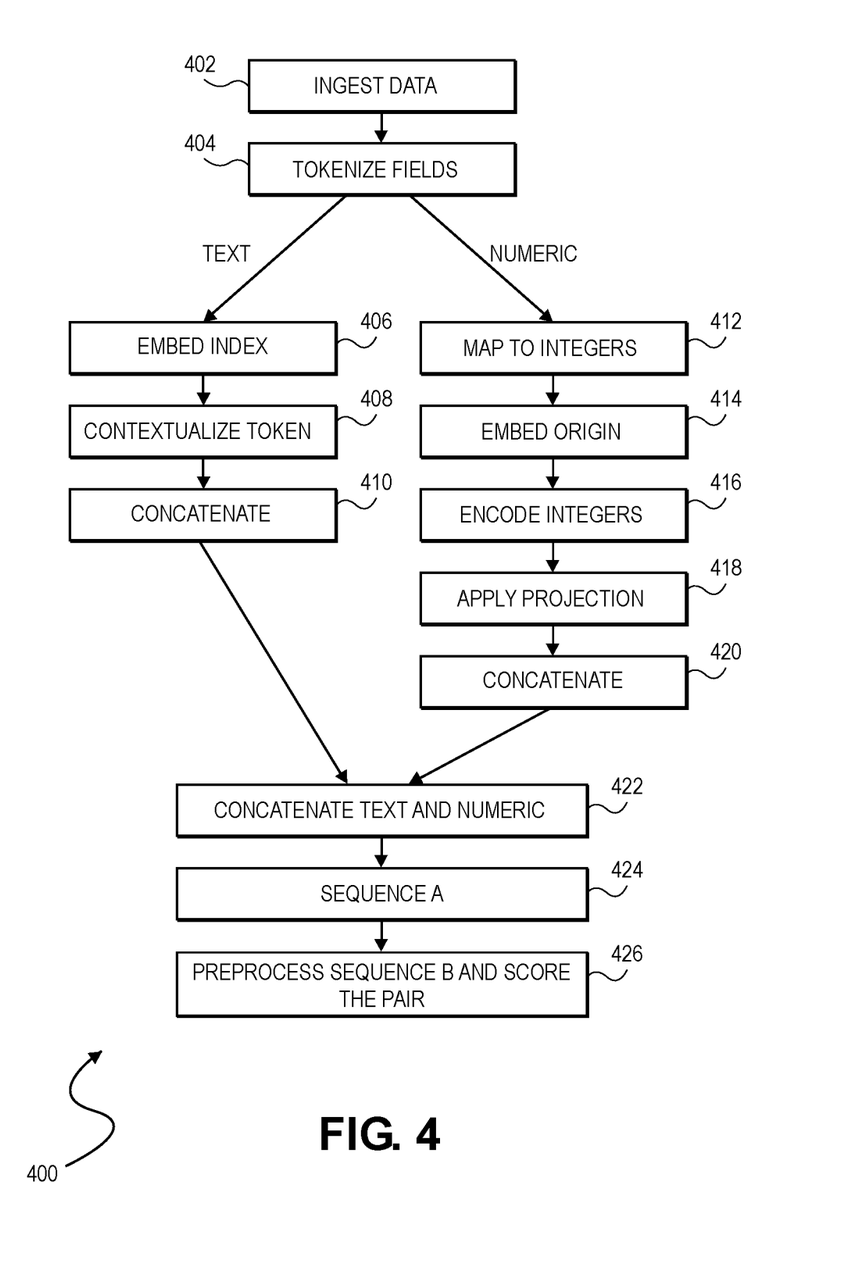
FIG. 4 depicts an exemplary flowchart illustrating a method of preprocessing entities for certain embodiments.

FIG. 4 illustrates an exemplary method 400 of preprocessing an entity for pairwise entity matching. Either entity in the paired entities may be preprocessed first. At step 402, decomposable attention neural network 200 may ingest a set of data. The data may be in the form of two distinct tables such as incoming payments table 102 and outgoing invoices table 106 illustrated in FIG. 1. As described above, the data may comprise any of textual, categorical, and/or numeric (including dates) data types. When training decomposable attention neural network 200, the data may be training data selected to train decomposable attention neural network 200 on matching the entities. The training data may comprise entity pairs that do not constitute a match to aid decomposable attention neural network 200 in learning entity pairs that do not match.

At step 404, data from each field of the entity may be tokenized. For example, each field in incoming entity 104a may be tokenized as shown in FIG. 3. In some embodiments, the data is tokenized on a character level, such that each Unicode character is tokenized. In some embodiments, the data may be tokenized on a sub-word level such that portions of a word or phrase are represented by a single token. For example, in the 'Business Partner Name' field of incoming entity 104a, 'ABCD' may be represented by a single token and 'CORP' may be represented by a different token. In some embodiments, the data may be tokenized on a whole word level. Combinations of different levels of tokenization are also considered herein. For example, some data fields may be configured to be tokenized at a whole word level, while other fields may be configured to be tokenized at a character level. As described above, numeric data may also be represented textually and tokenized.

Once the fields have been tokenized, processing may move to step 406 or 412. If the data type of the field is textual, processing moves to step 406 to continue preprocessing the textual data. If the data type of the field is numeric, processing moves to step 412 to continue preprocessing the numeric data. In some embodiments, as described above, numeric data may be preprocessed both as textual data and as numeric data.

At step 406, the index of the textual data is embedded. By embedding the indexes, the neural network may learn relationships between the various fields. For example, referring back to FIG. 1, a common string between the 'Business Partner Name' in incoming payments table 102 and the 'Organization" field of outgoing invoices table 106 may indicate a match, but a common string between the 'Note' field in incoming payments table 102 and the 'Amount' field of outgoing invoices table 106 would be coincidental and have no significance on the two entities being a match. Thus, the model may learn field-level relationships and patterns. Each field of the entity may be represented by an index corresponding to each token of the field. As such, the number of indexes may represent the dimension of the resultant vector.

Next, at step 408, tokens 302 for each field are contextualized. In some embodiments, tokens 302 may first be embedded using a trainable embedding layer. In a trainable embedding layer, the weights may be updated as tokens 302 are contextualized. Contextualization may be done by passing tokens 302 through numerous 1-dimensional convolutional neural network layers, recurrent neural network layers, or self-attention neural network layers. Broadly, any neural network architecture may be used to contextualize tokens 302 such that the neural network architecture may learn relationships between tokens 302 and the corresponding data table.

After contextualizing tokens 302, processing may move to step 410 where concatenation occurs. In some embodiments, step 410 comprises two distinct concatenation steps. First, the output of the contextualization layers may be concatenated along the embedding dimension to form the contextualized sequence. Subsequently, a trainable embedding of the column of origin index may be concatenated to the contextualized sequence. In some embodiments, if the column of origin embedding matches the dimension of the contextualized tokens, the trainable embedding of the column of origin index may instead be added to the contextualized sequence. The contextualized sequence may then have a dimension equal to the number of distinct characters. In the example given in FIG. 3, there are 43 distinct characters; as such, the contextualized sequence has a dimension of 43.

For fields where the data type is numeric, processing may instead proceed from step 404 to step 412 where each numeric value may be mapped to a single integer or a single distinct value. Dates may be mapped to an integer based off time elapsed from a reference date. In some embodiments, the integer value for dates may represent the number of epochs, seconds, days, weeks, months, or years, or any other reference value from a certain date.

Similar to step 406, at step 414, the index of origin for each numeric field in the entity will be embedded. As such, preprocessing architecture 300 may learn which field in the entity each numeric originated from. In some embodiments, step 414 may occur before step 412 such that the index of origin is embedded prior to the mapping of the numeric values to integers.

Next, at step 416, the numeric value is encoded as a vector. The numeric values may then be encoded as vectors and mapped to cosines and sines of geometrically progressing frequencies as described above with respect to Equation 1. As such, the resultant numeric value may comprise a vector having values between −1 and 1.

After the numeric has been embedded as a vector as described above, a projection may be applied to the embedded numeric at step 418. In some embodiments, this projection is done via linear mapping, whereby a fully connected neural network layer without an activation function is applied to match the dimension of the fully embedded numeric to the dimension of the encoded text sequence obtained at contextualizing block 308.

At step 420, the numeric data may be concatenated together. Step 420 may be substantially similar to step 410 where the textual tokens and the indexes are concatenated. At step 420, the fully embedded numeric is concatenated to the index of the numeric created at step 414. In some embodiments, the index of the numeric is added to the fully embedded numeric instead rather than concatenated. As described above, addition may be used when the dimensions of the fully embedded numeric and the index is the same.

Once both the numeric and the textual data for the ingested entity have been fully embedded, processing may proceed to step 422 where the preprocessed numeric and textual data may be concatenated together. This concatenation may increase the dimension of the sequence by the number of numeric and date fields present in the entity. For example, in FIG. 3, two numeric/date fields are present and were embedded as described above with respect to steps 412 to 420. As such, the size of the sequence increases from 43 to 45.

Processing then proceeds to step 424 where the preprocessed sequence is completed. Referring back now to FIG. 2, this may represent Sequence A in decomposable attention neural network 200. In some embodiments, Sequence B may be preprocessed before Sequence A.

At step 426, the other entity in the entity pair (e.g., Entity B) is preprocessed following the steps outlined above for preprocessing Entity B, thus resulting in two fully preprocessed sequences, Sequence A and Sequence B. In some embodiments, the weights are shared between the preprocessing of each entity in the pair. Once the entity pair is fully preprocessed, the fully preprocessed pair may be passed through decomposable attention module 200, and then sent to the scoring function for classification. The entity pair may be analyzed with the decomposable attention module 206 as described above with respect to FIG. 2. The scoring function may be configured to score the paired entities between a value of 0 and 1. Pairs that receive a score close to 0 may be considered to not match while pairs that score close to 1 may be considered to be a match. In some embodiments, a Partial Match class is introduced by using a scoring function that produces one score for the two entities being a 1:1 Match, and another score for the two entities being a Partial Match, i.e., the entities are part of a larger group of entities that constitute a match. Broadly, any scoring metric may be used herein to determine matches. For example, a range from 0 to 100 could be used instead.

Figure 5:
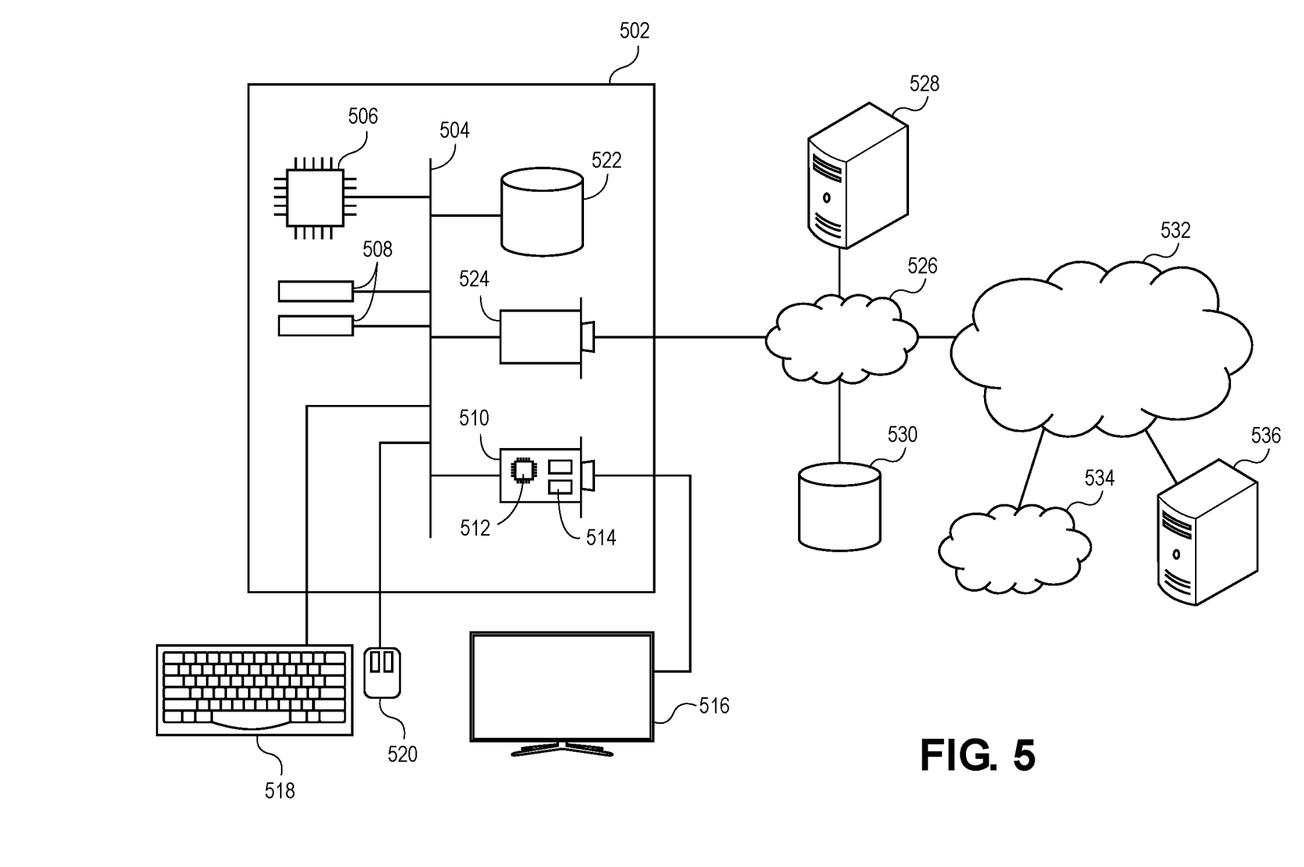
FIG. 5 depicts an exemplary hardware platform for certain embodiments.

Turning now to FIG. 5, in which an exemplary hardware platform for certain embodiments is depicted. Computer 502 can be a desktop computer, a laptop computer, a server computer, a mobile device such as a smartphone or tablet, or any other form factor of general- or special-purpose computing device containing at least one processor. Depicted with computer 502 are several components, for illustrative purposes. In some embodiments, certain components may be arranged differently or absent. Additional components may also be present. Included in computer 502 is system bus 504, via which other components of computer 502 can communicate with each other. In certain embodiments, there may be multiple busses or components may communicate with each other directly. Connected to system bus 504 is central processing unit (CPU) 506. Also attached to system bus 504 are one or more random-access memory (RAM) modules 508. Also attached to system bus 504 is graphics card 510. In some embodiments, graphics card 510 may not be a physically separate card, but rather may be integrated into the motherboard or the CPU 506. In some embodiments, graphics card 510 has a separate graphics-processing unit (GPU) 512, which can be used for graphics processing or for general purpose computing (GPGPU). Also, on graphics card 510 is GPU memory 514. Connected (directly or indirectly) to graphics card 510 is display 516 for user interaction. In some embodiments no display is present, while in others it is integrated into computer 502. Similarly, peripherals such as keyboard 518 and mouse 520 are connected to system bus 504. Like display 516, these peripherals may be integrated into computer 502 or absent. Also connected to system bus 504 is local storage 522, which may be any form of computer-readable media, such as non-transitory computer readable media, and may be internally installed in computer 502 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 524 is also attached to system bus 504 and allows computer 502 to communicate over a network such as network 526. NIC 524 can be any form of network interface known in the art, such as Ethernet, ATM, fiber, Bluetooth, or Wi-Fi (i.e., the Institute of Electrical and Electronics Engineers (IEEE) 802.11 family of standards). NIC 524 connects computer 502 to local network 526, which may also include one or more other computers, such as computer 528, and network storage, such as data store 530. Generally, a data store such as data store 530 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 528, accessible on a local network such as local network 526, or remotely accessible over public Internet 532. Local network 526 is in turn connected to public Internet 532, which connects many networks such as local network 526, remote network 534 or directly attached computers such as computer 536. In some embodiments, computer 502 can itself be directly connected to public Internet 532.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method of matching data table entities, the method comprising:
   ingesting a set of data comprising a plurality of entities, wherein each entity of the plurality of entities comprises textual data and numeric data;
   pairing entities from the plurality of entities to form an entity pair;
   for the textual data in each entity of the entity pair:
      tokenizing the textual data into a set of textual tokens; and
      contextualizing the set of textual tokens by passing the set of textual tokens through at least one neural network;
   for the numeric data in each entity of the entity pair:
      converting each numeric value in the numeric data to an integer; and
      mapping each integer to a vector;
   concatenating the textual data with the numeric data to form a sequence for each entity in the entity pair; and
   analyzing the sequences using a deep learning model to classify the entity pair.

2. The media of claim 1, wherein each entity comprises one of a row or a column in a data table.

3. The media of claim 1, wherein the at least one neural network is a one-dimensional convolutional neural network.

4. The media of claim 1, wherein the deep learning model is a decomposable attention neural network.

5. The media of claim 1, wherein:
   the numeric data further comprises date data; and
   the date data is converted to the integer by determining an amount of time from a reference date.

6. The media of claim 1, wherein the vector is a vector of a geometric progression of frequencies.

7. The media of claim 1, wherein the entity pair is classified using cross entropy loss.

8. A method of matching data table entities, the method comprising:
   ingesting a set of data comprising a plurality of entities, wherein each entity of the plurality of entities comprises textual data and numeric data;
   pairing entities from the set of data to form an entity pair;
   contextualizing, for each entity of the entity pair, the textual data using at least one neural network;
   mapping, for each entity of the entity pair, each numeric value of the numeric data to a vector;
   concatenating, for each entity of the entity pair, the textual data with the numeric data to form a sequence; and
   analyzing the sequences using a deep learning model to classify the entity pair.

9. The method of claim 8, wherein each entity of the plurality of entities comprises one of a row or a column in a data table.

10. The method of claim 8, further comprising:
    augmenting each textual token with an index representing a field of origin in the entity for the textual token; and
    augmenting each numeric value with the index representing the field of origin in the entity for the numeric value.

11. The method of claim 8, further comprising:
    pooling the sequences to reduce a dimension of the neural network;
    concatenating the sequences; and
    classifying the sequences using a binary classification.

12. The method of claim 8, wherein the at least one neural network is a long short term memory network.

13. The method of claim 8, further comprising:
    tokenizing, for each entity of the entity pair, the textual data, wherein the textual data is tokenized at a character level.

14. A system for matching data table entities, the system comprising:
    a data store storing a plurality of entities; and
    one or more non-transitory computer-readable media storing computer-executable instructions that, when executed by a processor, perform a method of matching data table entities, the method comprising:
       pairing entities from the plurality of entities, wherein each entity comprises textual data and numeric data;
       for the textual data in each entity of the paired entities:
          tokenizing the textual data into a set of textual tokens; and
          contextualizing the set of textual tokens using at least one neural network;
       for the numeric data in each entity of the paired entities:
          converting each numeric value in the numeric data to an integer; and
          mapping each integer to a vector of a geometrically progressing frequency;

concatenating the textual data with the numeric data to form a sequence for each entity of the paired entities; and analyzing the sequences using a deep learning model to classify the paired entities.

15. The system of claim 14, wherein each entity comprises one of a row or a column in a data table.

16. The system of claim 14, further comprising applying a linear mapping to the numeric data to match a dimension of the numeric data to a dimension of the textual data.

17. The system of claim 14, wherein the computer-executable instructions are further executed to classify the sequences using cross-entropy loss.

18. The system of claim 14, wherein the at least one neural network is a recurrent neural network.

19. The system of claim 14, wherein the system further comprises:
 a trained function represented by a neural network for scoring the paired entities, wherein the paired entities are classified into a classification based on a score from the trained function.

20. The system of claim 19, wherein the computer-executable instructions are further executed to perform a step of determining, by the trained function, a confidence score for the classification.

* * * * *